Feb. 21, 1933.  S. EGGLESTON  1,898,818
CONVEYER SYSTEM WITH DIVERTERS
Filed Jan. 10, 1931   3 Sheets-Sheet 3
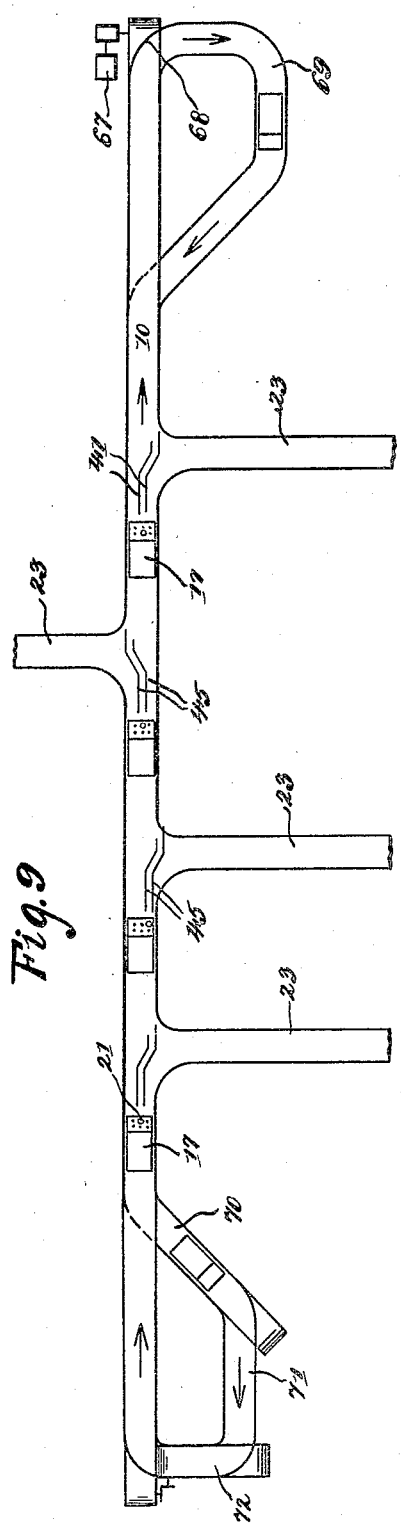
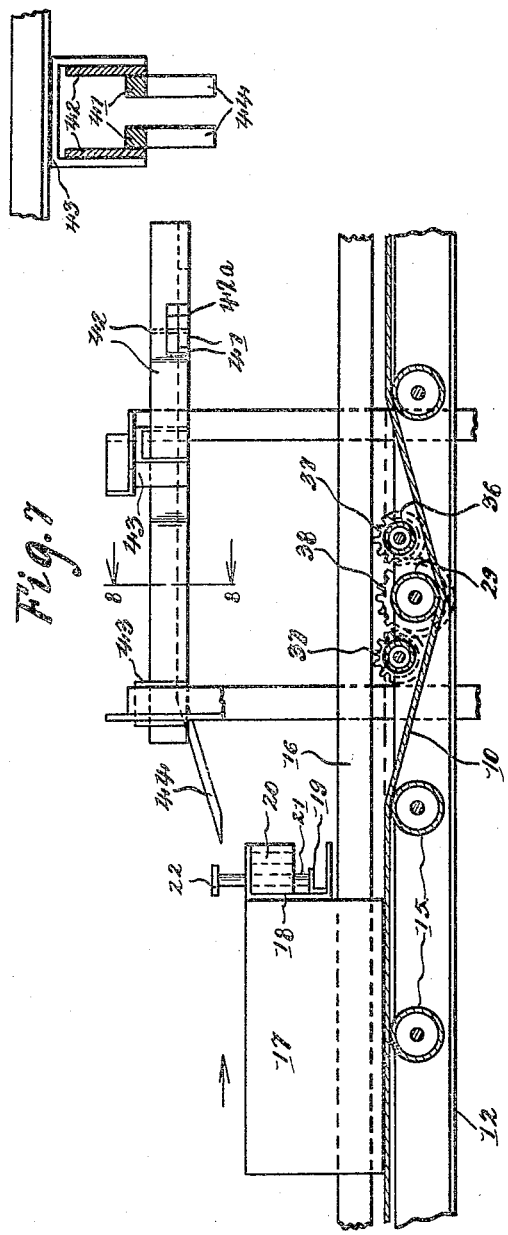
Inventor
Smith Eggleston
By Stryker & Stryker
Attorneys Patented Feb. 21, 1933

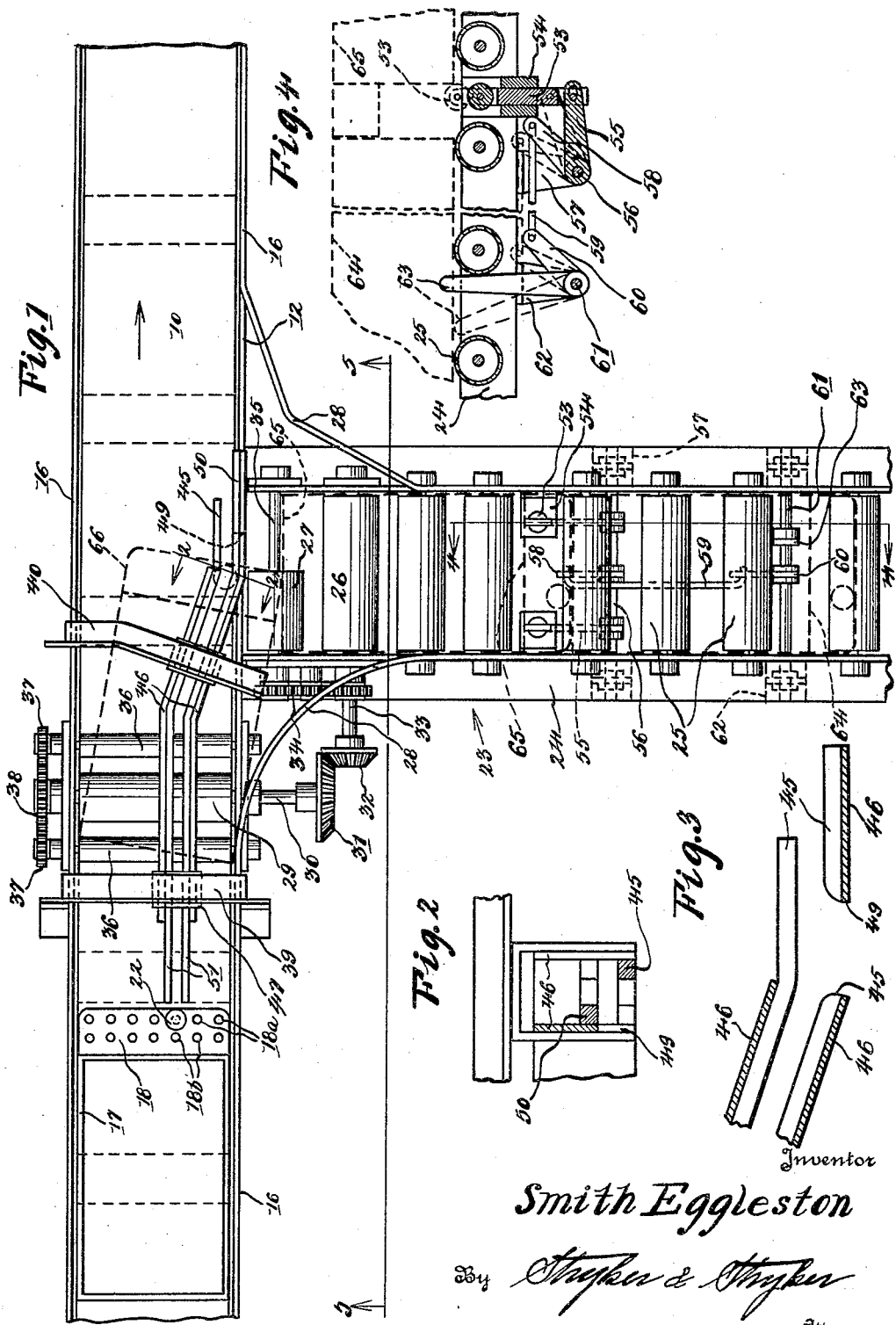

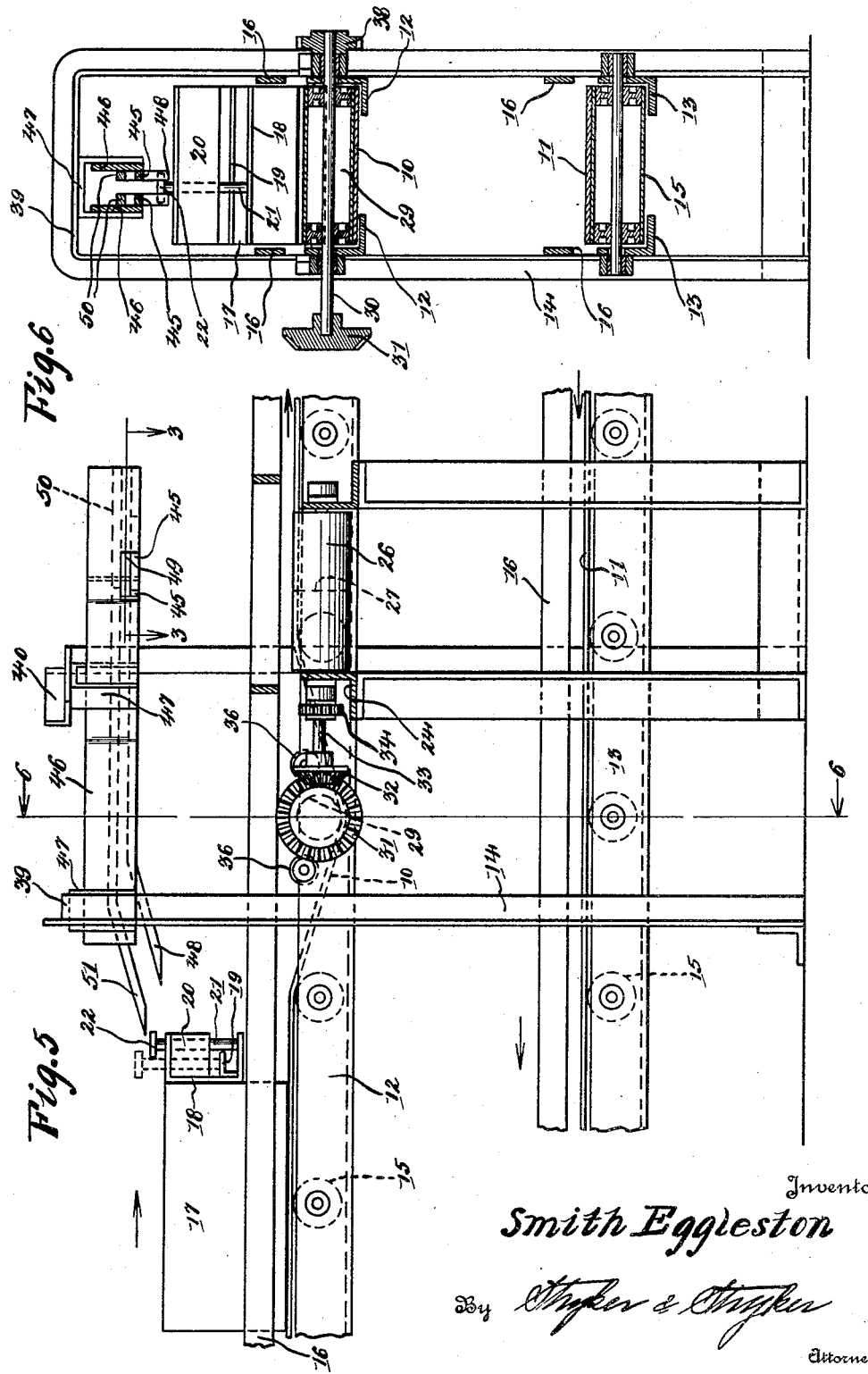

1,898,818

UNITED STATES PATENT OFFICE

SMITH EGGLESTON, OF ST. PAUL, MINNESOTA, ASSIGNOR TO STANDARD CONVEYOR COMPANY, OF NORTH ST. PAUL, MINNESOTA, A CORPORATION OF MINNESOTA

CONVEYER SYSTEM WITH DIVERTERS

Application filed January 10, 1931. Serial No. 507,873.

This invention relates to conveyer systems having automatic diverters for delivering carriers to a number of points along the main conveyer, the device being an improvement on the conveyer system described in my application for patent, Serial No. 500,019, filed December 4th, 1930.

It is my object to provide a conveyer system with novel switches and coacting carriers of inexpensive and rugged construction.

More particularly, it is my object to provide carriers with extensible switch-engaging members adapted to be set in selected positions to coact with stationary switches located at the sidings, said switches being out of the path of all of the carriers, but each having a projection to engage and extend a switch-engaging member in one of its positions on the carrier.

Another object is to provide a carrier with a novel arrangement of switch engaging members whereby a large number of different diverting points may be selected.

Another object is to provide, in a system of this kind, conveying and diverting mechanism adapted to operate with certainty even where the carriers are positioned in close proximity to each other on the main conveyer.

A further object is to provide an endless conveyer with mechanism for diverting the carriers from said conveyer at sidings constituting the stations for operators, the sidings and diverting mechanism being arranged to cause a recirculation of a carrier when a siding has previously been filled with carriers or is otherwise closed.

A still further object is to provide carriers with switch-engaging members projecting therefrom at different distances to coact with switches located at different distances from the path of the carriers, and to prevent diverting by coaction of a switch with any carrier having a switch-engaging member projecting a greater extent than the engaging member designed to coact with that switch.

Other objects will appear and be more fully pointed out in the following specification and claims.

Referring to the accompanying drawings:

Figure 1 is a plan view showing a portion of the main conveyer and one of the sidings with one of my improved switches and also showing one of the carriers having a switch-engaging member positioned to coact with the switch;

Fig. 2 is a fragmentary, vertical section through one of the switches and its support, taken on the line 2—2 of Fig. 1;

Fig. 3 is a fragmentary, horizontal section taken on the line 3—3 of Fig. 5;

Fig. 4 is a vertical section taken on the line 4—4 of Fig. 1;

Fig. 5 is a vertical section taken on the line 5—5 of Fig. 1;

Fig. 6 is a section taken on the line 6—6 of Fig. 5;

Fig. 7 is a longitudinal section through a portion of the main conveyer adjacent to a siding, and showing one of the more elevated switches adapted to coact with a carrier having a switch-engaging pin in its elevated position;

Fig. 8 is a section taken on the line 8—8 of Fig. 7; and

Fig. 9 is a diagrammatic plan view showing a typical conveyer system with my novel carriers and diverting mechanism.

The main conveyer is of the type having an endless belt arranged to support carriers on its upper and lower reaches 10 and 11 respectively. Horizontally extending angle bars 12 and 13 are secured to supporting legs 14 along the upper and lower reaches respectively, and rollers 15 extend between the rails to support the belt. Guide rails 16 extend along each side of the path of the carriers on the conveyer.

The carriers have rectangular, open boxes or receptacles 17 to receive the goods or material to be transported and on the front of each of these receptacles is mounted a support for switch-engaging members. The support has channel shaped member 18 secured to the front end of the carrier with flanges projecting horizontally, one above another. A small angle bar 19 is mounted above the lower flange and a wooden bar 20 is fixed beneath the upper flange of the bar 18. Two rows of vertical sockets are formed in the upper flange of the bar 18 and in the bar 20 to receive a switch-engaging pin 21 in different positions transverse the carrier. The front row 18a of these sockets is located in front of the angle bar 19 so that a pin 21 inserted in any of the sockets in the front row will rest on the lower flange of the bar 18, as shown in full lines in Fig. 5. As shown in dotted lines in Fig. 5, the bar 19 is arranged to support the pin 21 when placed in any of the sockets of the rear row 18b so that the pin projects to a greater extent from the sockets of this row. An annular head 22 on the pin 21 presents a projecting flange to be engaged for actuating the pin as hereinafter described. The pin fits loosely in the several sockets so that it may be extended to render a switch operative and is free to fall to its retracted position when released.

Sidings 23 are arranged to receive carriers from the main conveyer. These sidings, as best shown in Figs. 1 and 5, have side rails 24 supporting gravity rollers 25 and power-driven rollers 26 and 27 located near the main conveyer. A guide bar 28 extends along each side above the rollers 25 and 26 and the ends of these guide bars diverge toward the main conveyer where they connect with the guide rails 16, leaving an opening at each siding through which the carriers may pass from the main conveyer to the siding.

Power for driving the rollers 26 and 27 is received from the belt of the main conveyer which is snubbed down from its horizontal path beneath the lower periphery of a drum 29. This drum is mounted in suitable bearings on the side rails of the main conveyer and has an axial shaft 30 which projects and is provided with a beveled gear 31 in mesh with a beveled pinion 32 on an axial shaft 33 for turning the roller 26. The shaft 33 has fixed thereon one of a series of three gears 34 which establish the connection with an axial shaft 35 supporting and driving the roller 27. The upper periphery of the drum 29 is located beneath the path of the carriers and at each side of said drum a power-driven roller 36 is arranged to support and actuate each carrier for a brief period as it approaches the siding. The rollers 36 are positively driven by pinions 37 meshing with a drive gear 38 on the shaft 30 supporting the drum 29. As best shown in Fig. 7, the gear 38 is larger than the pinions 37 so that the rollers 36 are driven at a peripheral speed which is greater than the lineal speed of the belt. By this arrangement, carriers as they approach the siding are momentarily accelerated so that in case two of them are placed in end to end engagement with each other on the main conveyer they will be separated as they approach the siding and will be free to turn, as hereinafter described, onto the siding.

Horizontally disposed supports 39 and 40 are provided for a switch adjacent to each siding. These supports may be formed integral with extensions of the legs 14 or otherwise secured to the main frame of the conveyer.

Two groups of switches are provided, one group being designed to engage the pins 21 in the front rows 18a of sockets and the other group being designed to engage said pins in the rear rows 18b of sockets on the carriers. The latter group of switches is mounted entirely out of the path of the pins in the front rows of sockets, being positioned farther from the carriers and being of the simplified construction indicated in Figs. 7 and 8. It will be understood that the several switches of a group are each located to coact with a pin 21 in one of its positions only, although the position of switches of the elevated group may be in alignment longitudinally of the conveyer with switches of the lower group.

Each of the more elevated switches consists of a pair of parallel bars 41 adapted to receive the pin 21 between them and to support said pin by engagement with the head 22. The bars 41 are secured to the inner faces of side plates 42 which are held in spaced parallel relation by inverted U-shaped hangers 43. The hangers are in turn bolted or otherwise secured to the horizontal supports 39 and 40 respectively. The receiving ends of the bars 41 have downwardly extending cam members 44 arranged to engage beneath the head 22 of a pin 21 in one of its positions transverse the carrier.

Each pair of cam members 44 and the connected ends of the switch bars 41 extend longitudinally in the direction of movement of the carriers for a short distance and then the bars 41 and plates 42 are bent at an oblique angle toward the siding so as to actuate the front end of the carrier laterally from the main conveyer until it rests on the power-driven roller 27. The switch has an opening 42a in one of the plates 42 and associated bar 41 arranged to release the carrier as soon as it is under the influence of the roller 27 which advances it to the roller 26 in the absence of an obstruction on the siding. In the normal operation, the diverted carriers move along the stop on the sidings.

Each of the lower switches, designed to coact with the pins 21 in the front rows 18a of the sockets on the carriers, has a pair of switch bars 45 extending in spaced, parallel relation to each other and supported on plates 46, similar to the bars 41 and plates 42. The plates 46 are secured in spaced, parallel relation to each other by inverted U-shaped hangers 47 which are rigidly suspended from the supports 39 and 40 respectively. A pair of cam members 48 at the front ends of the switch bars 45 is arranged to engage beneath the head 22 of a pin 21 located in one of the sockets of the front row on a carrier. An opening 49 in the side of the plate 46 adjacent to the siding permits the pin 21 to pass out from engagement with the switch when the carrier has been moved laterally to rest on the roller 27. As indicated in Fig. 2, the switch bar 45 adjacent to the siding terminates at the front end of the opening 49 but the companion bar 45 continues for a short distance beyond said opening.

To prevent a carrier having a pin 21 in the rear row 18b of sockets from being diverted at a siding having the lower switch bars 45, a guide consisting of parallel bars 50 is mounted above the switch bars 45 between the plates 46. Cam members 51, in continuation of the front ends of the bars 50, project obliquely downward to engage beneath the heads of the pins 21 in the rear row. The bars 50 extend past and above the opening 49 as clearly shown in Fig. 1, to positively guide the carriers with the more elevated pins past the sidings having the lower switch bars.

Means are provided for automatically blocking the entrance to a siding when the siding is filled with carriers. For this purpose a pair of stops 53 is located a distance equal to the length of a carrier from the roller 27 so that the carrier which fills the siding is stopped with its rear end in position to guide any succeeding carrier intended for the same siding back onto the main conveyer. The stops 53 are movable vertically in suitable bearings 54. Connected to the lower end of each stop is an actuating arm 55 secured to a shaft 56 extending transverse the siding and supported in bearings 57. A crank 58 fixed on the shaft 56 is connected by a link 59 to a crank 60 on a shaft 61 extending parallel to the shaft 56 and supported in bearings 62. A lever 63 is fast on the shaft 61 and projects between a pair of the rollers 25 to be actuated by a carrier 64 on the siding. The upper ends of the stops 53 are provided with anti-friction wheels to engage the front end of a carrier 65 which follows the carrier 64 into the siding. The rear end of the carrier 65 is thus located at such a point that it is engaged by a carrier 66 (which has been influenced by the switch bars 45) at the moment when the pin 21 on the carrier 66 tends to pass out through the slot 49. At this time the carrier 66 is still under the influence of the main conveyer and, as the pin 21 is retained on the bars 45, the carrier 66 is actuated by the combined guidance of the switch and rear end of the carrier 65 to pass along the main conveyer.

As shown in Fig. 9, the sidings may be located at either side of the main conveyer and the main conveyer belt may be driven by a motor 67. The carriers are automatically removed from the upper run 10 of the main conveyer by an oblique guide member 68 and a gravity conveyer 69 is employed to deliver the carriers removed by said member to the lower run 11 of the main conveyer. From the lower run, the carriers are elevated by a suitable belt conveyer 70 whence they pass successively to conveyers 71 and 72 for returning the carriers to the upper run of the main conveyer.

*Operation*

Each of the several switches for diverting the carriers to a siding is located at a different point transversely or vertically from the others so as to coact with the pin 21 in a different position on the carrier. The carriers may be loaded and placed on the main conveyer at any point along its path and the operator, in order to direct the carrier, places a pin 21 in a socket 18a or 18b corresponding to the location of the switch where the carrier is to be diverted to a siding.

Assuming that the pin 21 has been placed in one of the sockets in the front row 18a on the carrier, the latter will pass along the main conveyer until it reaches a siding where the switch is located to coact with the pin in the adjusting position. Upon arrival at such switch the cam members 48 engage beneath the head 22 of the pin and as further motion along the conveyer continues, the pin 21 will be extended while passing between the switch bars 45 with the head 22 resting on said bars in extended position. The front end of the carrier is moved laterally until it engages the upper periphery of the power-driven roller 27. At this movement the pin 21 arrives at the opening 49 and under the influence of the roller 27 passes out of the switch through said opening. The pin immediately drops to retracted position while the carrier is turned into the siding and is advanced on the upper peripheries of the rollers 25 and 26.

Upon arrival of a carrier having a pin located in one of the sockets 18b at a siding where the switch is located to coact with a pin in a socket 18a immediately in front of the socket carrying the pin, the pin is engaged by the cam members 51 and extended thereby to pass between the bars 45 and 50 with the head of the pin resting on the bars 50. In this case, the pin is not released when the carrier comes under the influence of the roller 27 and the carrier is guided past said roller and returned to the main conveyer by the bars 50. Subsequently, when such carrier (with elevated pin) reaches the siding having the switch bars 41 in position to coact with the pin, the cam members 44 extend the pin and cause it to pass between the bars 41 and the latter bars guide the carrier onto the siding, the pin being released and dropping to retracted position as soon as the carrier has been moved, under the influence of the roller 27, to cause the pin 21 to pass out through the opening 42a in the side of the switch. A carrier with a pin 21 in a socket of the front row 18a passes freely beneath all of the switches except the one having cam members 48 projecting downward to such point as to coact with the pin in its selected position. The same is true of each carrier having a pin in a rear socket 18b, except that the pin will engage with the guide bars 50 and members 51 associated with a low switch located to correspond to the position of the pin. Thus, irrespective of the order of the switches along the main conveyer, the carriers are not diverted at any siding other than that selected by a pin. This feature of the system makes it possible to recirculate a carrier and to deliver it automatically at any selected siding, after traversing the complete circuit of the main conveyer, in the event that any siding is filled or its entrance is blocked by a carrier 65, as hereinbefore described, when the carrier first arrives at the siding.

It will be understood that one or more of the rollers 36 are associated with each switch to momentarily increase the speed of the carriers at the time when at least a small space between carriers is desirable. This feature is only desirable or necessary where the carriers are sometimes placed, or otherwise caused to move, in end to end contact with each other on the main conveyer. Only a slight space between carriers is advantageous at the switches with my improved system and the usual devices for producing relatively wide spacing are unnecessary.

Having described my invention what I claim as new and desire to protect by Letters Patent is:

1. A conveyer system having in combination a main conveyer, a siding, a carrier movable along the conveyer, an extensible switch engaging member on said carrier adapted to be placed in different positions transverse the carrier, a stationary switch disposed to coact with said member in a selected position of the latter to divert the carrier to said siding and means associated with said switch for extending said member to render the switch operative.

2. A conveyer system having in combination a main conveyer, a plurality of sidings to receive carriers from said conveyer, carriers movable along the conveyer, an extensible switch engaging member on each carrier adapted to be placed in different positions transverse the carriers to select the siding to which the carrier is to be delivered, a stationary switch associated with each siding to coact with said members in different positions of the latter to divert the carriers at selected sidings and means associated with said switches for extending said members to render the switches operative.

3. A conveyer system having in combination a main conveyer, a siding, a carrier movable along the conveyer, a switch engaging member on said carrier and a stationary switch associated with said siding and having spaced, parallel bars arranged to receive said member between them, said bars extending across the entrance to said siding to guide the carrier past the siding along the main conveyer and one of said bars having an opening therein to permit the passage of the carrier from the main conveyer to said siding.

4. A carrier for a conveyer system having automatic diverters comprising, a receptacle, a support for a switch engaging member in different positions transverse said receptacle and a switch engaging member movable to a number of positions on said support and extensible from said receptacle in any of said positions.

5. The carrier specified in claim 4 in which said switch engaging member is normally inoperative but movable to project a greater degree for rendering a diverter operative and means for extending said switch engaging member to operative position.

6. A carrier for a conveyer system having automatic diverters comprising, a receptacle, a support for a switch engaging member in different positions transverse said receptacle and a switch engaging member movable to a number of positions on said support and a contact element on said member adapted to be engaged to extend said member from said receptacle in any of said positions.

7. A carrier for a conveyer system having automatic diverters comprising a receptacle, a series of sockets for pins in different positions transverse said receptacle, a pin adapted to be inserted in any of said sockets and slidable longitudinally therein to extend predetermined distances from the receptacle and projections on said pins adapted to be actuated to extend said pins.

8. A carrier for a conveyer system having automatic diverters comprising a receptacle, a plurality of horizontally disposed rows of sockets for pins in different positions transverse said receptacle, certain of said sockets being adapted to cause a pin to project a greater distance than others, a pin adapted to be inserted in any of said sockets and slidable vertically therein to extend predetermined distances from the receptacle and means on said pins adapted to be actuated to extend said pins.

9. A conveyer system having in combination, a main conveyer, sidings to receive carriers therefrom, a switch for actuating a carrier laterally from the main conveyer, associated with each of said sidings and normally located out of the path of carriers on said conveyer and a carrier movable along said conveyer comprising, a receptacle, a support for a switch engaging member, a switch engaging member normally retracted to pass said switch, and extensible from said receptacle to engage said switch and means for extending said switch engaging member to operative position.

10. A conveyer system having in combination, a main conveyer, sidings to receive carriers therefrom, a switch associated with each of said sidings and normally located out of the path of carriers on said conveyer, a carrier movable along said conveyer, a switch engaging member on said carrier normally retracted to pass said switch, and extensible to engage said switch and means for automatically extending said member to render said switch operative.

11. A conveyer system having in combination, a main conveyer, sidings to receive carriers therefrom, a switch for actuating a carrier laterally from the main conveyer, associated with each of said sidings and normally located out of the path of carriers on said conveyer and a carrier movable along said conveyer comprising, a receptacle, a support for a switch engaging member in different positions transverse said receptacle, a switch engaging member movable to a number of positions on said support, normally retracted to pass said switch, and extensible from said receptacle in said several positions to engage said switches respectively and means for extending said switch engaging member to operative position.

12. A conveyer system having in combination, a main conveyer, sidings to receive carriers therefrom, a switch associated with each of said sidings and extending horizontally above the path of carriers on said conveyer, a carrier movable along said conveyer, a switch engaging member on said carriers normally retracted to pass said switches, and extensible to engage said switches respectively and a downwardly projecting element of each switch arranged to extend said member for rendering the switch operative.

13. A conveyer system having in combination, a main conveyer, sidings to receive carriers therefrom, a switch associated with each of said sidings and normally located out of the path of carriers on said conveyer, a carrier movable along said conveyer, a switch engaging member movable to a number of positions on said carrier to select the switch where the carrier is to be diverted, said member being normally retracted to pass said switches, and being extensible to engage a selected switch and a cam element projecting from each switch to engage said member in one of its positions for rendering the selected switch operative.

14. A conveyer system having in combination, a main conveyer, sidings to receive carriers therefrom, a switch associated with each of said sidings and extending horizontally above the path of carriers on said conveyer, a carrier movable along said conveyer, an upwardly projecting, switch engaging member movable to a number of positions transversely of said carrier to select the switch where the carrier is to be diverted, said member being normally retracted to pass said switch, and being extensible upward to engage a selected switch and a cam member projecting downward from each switch to raise said member and thereby render a selected switch operative.

15. In a conveyer system having a main conveyer, sidings and carriers movable along said conveyer, a switch associated with each siding adjacent to the path of the carriers on the main conveyer to divert carriers to the sidings, certain of said switches being located farther from the path of the carriers than others, switch engaging members on the carriers to coact with said switches in diverting the carriers, certain of said members being more extended than others to coact with the more remote switches and guides for the more extended of said members associated with the switches located nearer said path to render the latter switches inoperative to divert carriers having the more extended switch engaging members.

16. In a conveyer system having a main conveyer, sidings and carriers movable along said conveyer, a switch associated with a siding and extending horizontally above the path of the carriers on the main conveyer to divert carriers to said siding, switch engaging members on the carriers to coact with said switch in directing carriers, said members projecting at different heights above the carriers and a guide for the more extended of said members associated with said switch to render said switch inoperative to divert carriers having the more extended switch engaging members.

17. In a conveyer system having a main conveyer, sidings and carriers movable along said conveyer, a stationary switch associated with each siding and extending above the path of the carriers on the main conveyer to divert carriers to the sidings, certain of said switches being located at a greater height farther above the path of the carriers than others, switch engaging members on the carriers to coact with said switches in directing the carriers, certain of said members being more extended than others to coact with the more elevated switches and a guide for the more extended of said members disposed above each of the lower switches to render the latter switches inoperative to divert carriers having the more extended switch engaging members.

18. A conveyer system having in combination, a main conveyer, a siding, carriers to travel along said conveyer, means for turning a carrier from the main conveyer to said siding, and means associated with said turning means for momentarily increasing the speed of the carriers to space them on the main conveyer and permit free turning of the same.

19. A conveyer system having in combination, a main conveyer having a power-driven belt, a siding, carriers to travel along said conveyer, a switch for diverting carriers at said siding, and means having driving connection with said belt for momentarily increasing the speed of carriers at said switch to thereby permit free turning of the carriers from the main conveyer to the siding.

20. In a conveyer system, a main conveyer having a power-driven belt, a siding, carriers to travel along the main conveyer, means for diverting carriers at said siding, a roller associated with said diverting means and arranged to engage the carriers for increasing the speed of carriers and driving means for actuating said roller at a peripheral speed in excess of the lineal speed of the belt.

In testimony whereof, I have hereunto signed my name to this specification.

SMITH EGGLESTON.